US010310362B2

(12) United States Patent
Grunnet-Jepsen et al.

(10) Patent No.: US 10,310,362 B2
(45) Date of Patent: Jun. 4, 2019

(54) LED PATTERN PROJECTOR FOR 3D CAMERA PLATFORMS

(71) Applicant: Intel Corporation, Santa Clara, CA (US)

(72) Inventors: Anders Grunnet-Jepsen, San Jose, CA (US); John Sweetser, Sunnyvale, CA (US); Akihiro Takagi, San Mateo, CA (US); Paul Winer, Santa Clara, CA (US); John Woodfill, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/024,024

(22) Filed: Jun. 29, 2018

(65) Prior Publication Data

US 2019/0041736 A1  Feb. 7, 2019

(51) Int. Cl.
*G03B 21/20* (2006.01)
*H04N 5/74* (2006.01)
*G03B 21/00* (2006.01)
*G02B 27/09* (2006.01)

(52) U.S. Cl.
CPC ..... *G03B 21/2033* (2013.01); *G02B 27/0961* (2013.01); *G03B 21/005* (2013.01); *H04N 5/7416* (2013.01)

(58) Field of Classification Search
CPC ............... G03B 21/005; G03B 21/147; G03B 21/2033; G03B 21/2013; H04N 13/00; H04N 13/02; H04N 13/0022; H04N 13/128; H04N 13/0253; H04N 13/0271
See application file for complete search history.

(56) References Cited

U.S. PATENT DOCUMENTS

| 5,398,125 A * | 3/1995 | Willett | G02F 1/133526 349/5 |
| 9,826,216 B1 * | 11/2017 | Hazeghi | G02B 27/0075 |
| 2006/0204861 A1 * | 9/2006 | Ben-Eliezer | G02B 27/0075 430/5 |
| 2012/0182529 A1 * | 7/2012 | Otani | G02B 5/0215 353/38 |
| 2016/0254638 A1 * | 9/2016 | Chen | H04N 13/254 362/11 |
| 2017/0010473 A1 * | 1/2017 | Ide | G02B 3/0056 |

\* cited by examiner

*Primary Examiner* — Sultan Chowdhury
(74) *Attorney, Agent, or Firm* — Green, Howard & Mughal LLP.

(57) ABSTRACT

A light pattern projector with a pattern mask to spatially modulate an intensity of a wideband illumination source, such as an LED, and a projector lens to reimage the spatially modulated emission onto regions of a scene that is to be captured with an image sensor. The projector lens may comprise a microlens array (MLA) including a first lenslet to reimage the spatially modulated emission onto a first portion of a scene, and a second lenslet to reimage the spatially modulated emission onto a first portion of a scene. The MLA may have a fly's eye architecture with convex curvature over a diameter of the projector lens in addition to the lenslet curvature. The pattern mask may be an amplitude mask comprising a mask pattern of high and low amplitude transmittance regions. In the alternative, the pattern mask may be a phase mask, such as a refractive or diffractive mask.

19 Claims, 14 Drawing Sheets

LED PATTERN PROJECTOR FOR 3D CAMERA PLATFORMS

BACKGROUND

A digital camera is a component often included in electronic media device platforms. Digital cameras are now available in wearable form factors (e.g., video capture earpieces, video capture headsets, video capture eyeglasses, etc.), as well as embedded within smartphones, tablet computers, and notebook computers, etc. Digital cameras typically include image sensors with 2D arrays of photosensitive areas (e.g., photodiodes) where light is collected and converted into charge (photocharge). The photocharge is a function of the amount of light collected, which is dependent on both the light intensity and the duration of collection. Photocharge is read out and correlated with spatial position within the array to construct a representative image of a scene from which the light was collected.

Three-dimensional (3D) cameras are becoming more common, and can now be found on many devices or platforms. These devices provide enhanced entertainment and utility experiences to an end user. For example, photography may be enhanced by depth information output from the 3D camera. Depth information may be derived through one or more techniques including stereo imaging, structured light, coded light, time of flight (TOF), and lidar. Deriving depth information in a manner that is dependent on features in the scene is challenging because suitable features may not always be available. Technologies that address this challenge are therefore advantageous.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
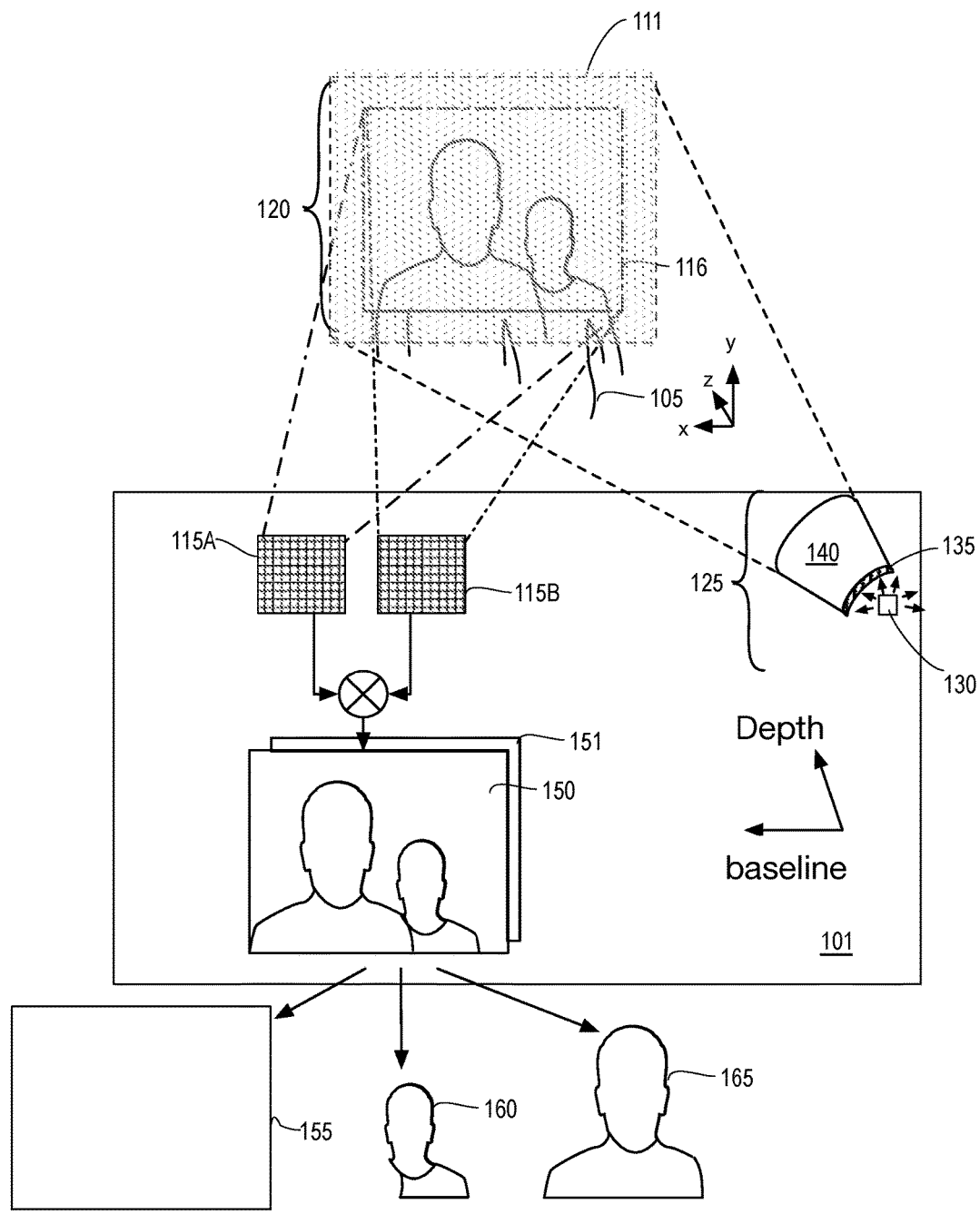
FIG. 1 is a schematic illustrating operation of a camera platform including a LED pattern projector, in accordance with some embodiments.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

Reference is made in the following detailed description to the accompanying drawings, which form a part hereof, wherein like numerals may designate like parts throughout to indicate corresponding or analogous elements. It will be appreciated that for simplicity and/or clarity of illustration, elements illustrated in the figures have not necessarily been drawn to scale. For example, the dimensions of some of the elements may be exaggerated relative to other elements for clarity. Further, it is to be understood that other embodiments may be utilized and structural and/or logical changes may be made without departing from the scope of claimed subject matter. It should also be noted that directions and references, for example, up, down, top, bottom, over, under, and so on, may be used to facilitate the discussion of the drawings and embodiments and are not intended to restrict the application of claimed subject matter. Therefore, the following detailed description is not to be taken in a limiting sense and the scope of claimed subject matter defined by the appended claims and their equivalents.

In the following description, numerous details are set forth, however, it will be apparent to one skilled in the art, that the present invention may be practiced without these specific details. In some instances, well-known methods and devices are shown in block diagram form, rather than in detail, to avoid obscuring the present invention. Reference throughout this specification to "an embodiment" or "in one embodiment" means that a particular feature, structure, function, or characteristic described in connection with the embodiment is included in at least one embodiment of the invention. Thus, the appearances of the phrase "in an embodiment" in various places throughout this specification are not necessarily referring to the same embodiment of the invention. Furthermore, the particular features, structures, functions, or characteristics may be combined in any suitable manner in one or more embodiments. For example, a first embodiment may be combined with a second embodiment anywhere the two embodiments are not specified to be mutually exclusive.

The terms "coupled" and "connected," along with their derivatives, may be used herein to describe structural relationships between components. It should be understood that these terms are not intended as synonyms for each other. Rather, in particular embodiments, "connected" may be used to indicate that two or more elements are in direct physical or electrical contact with each other. "Coupled" my be used to indicated that two or more elements are in either direct or indirect (with other intervening elements between them) physical or electrical contact with each other, and/or that the two or more elements co-operate or interact with each other (e.g., as in a cause an effect relationship).

The terms "over," "under," "between," "on", and/or the like, as used herein refer to a relative position of one material layer or component with respect to other layers or components. For example, one layer disposed over or under another layer may be directly in contact with the other layer or may have one or more intervening layers. Moreover, one layer disposed between two layers may be directly in contact with the two layers or may have one or more intervening layers. In contrast, a first layer "on" a second layer is in direct contact with that second layer. Similarly, unless explicitly stated otherwise, one feature disposed between two features may be in direct contact with the adjacent features or may have one or more intervening features.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C.

As described further below, a camera platform with one or more image sensor includes a light pattern projector operable to project a light pattern upon a scene within a field of view (FOV) of the image sensor. The pattern projector may advantageously include a LED illumination source having any suitable wavelength(s). LED illumination sources are to be distinguished from laser illumination sources. Although laser sources can provide high contrast at low powers (i.e., high efficiency), laser-based pattern projection approaches can suffer from relatively high cost, speckle artifacts, and eye safety concerns. Laser speckle is a particular problem for laser-based pattern projection approaches as it can severely impact the RMS error of a 3D depth sensor (e.g., by >30%), even after various electronic or optical schemes are employed to minimize laser speckle. Drift is another drawback of laser-based pattern projection systems because laser intensity and/or wavelength may change over time, for example, in response to temperature fluctuations.

In accordance with embodiments herein, a LED pattern projector employs one or more projection lenses, a LED source, and a pattern mask between the LED source and projection lenses. FIG. 1 is a schematic illustrating components and operation of a camera platform having LED pattern projector, in accordance with some embodiments. In FIG. 1, a camera platform 101 is operable to collect one or more image frame of a real world scene 105. Within scene 105, depth is aligned with the z-axis. This is a simplification reasonable where camera FOV 116 is relatively small and complications associated with a larger FOV are omitted for the sake of brevity. Camera platform 101 includes first image sensor 115A, a second image sensor 115B, and a light pattern projector 125.

In the illustrated embodiment, camera platform 101 may be considered an array camera having a plurality of image sensors 115A, 115B with a predetermined baseline relationship. Image sensors 115A and 115B may be of any known digital sensor architecture such as, but not limited to, a CMOS sensor array. Image sensors 115A, 115B are advantageously operable to collect RGB (e.g., 400-700 nm wavelengths) as well as NIR (e.g., 701-1200 nm) within camera FOV 116. CMOS image sensors are inherently NIR sensitive to some extent and may therefore be considered RGB(NIR) sensors. For some embodiments, camera platform 101 includes an image sensor and/or color filter configured to include a specific NIR channel, often referred to as RGBNIR sensor as opposed to an RGB(NIR) sensor that does not have an independent NIR channel. Each image sensor may receive light through one or more apertures. Separate RGB and NIR apertures may be employed, for example. A filter array that passes both NIR and RGB within at least some portions of an image sensor array may be disposed within the camera optical path. In one exemplary embodiment, the filter array is a Bayer color filter array (CFA). In other embodiments, the filter array is a NIR-enhanced filter array (e.g., where half of green filter tiles of the Bayer mosaic are replaced with a visible light blocker). Image sensors 115A, 115B may provide an intensity resolution of 10 bits, or more per pixel, and may be operable to capture continuous video frames progressively. Image sensors 115A, 115B may have a pixel frequency of 25 MHz, or more. Camera platform 101 may further include an analog amplifier, an A/D converter, and other components to convert incident light into a digital signal corresponding to raw RGB and IR image data.

Each of image sensors 115A, 115B are to output image data captured from a different camera viewpoint. In exemplary embodiments, the image from each viewpoint is captured over substantially the same time span such that the two resulting image frames contain image data for a single scene 105. One of the image frames collected may be designated a reference and combined with the other into a captured image frame 150 having depth information. For example, where image sensor 115A has the same or higher resolution (e.g., 8 megapixel, or more) as image sensor 115B (e.g., 720p, HD, 8 megapixel, or more), image sensor 115A may provide a default reference image and image data from sensor 115B may be employed to determine disparity (or other depth) information associated with captured image frame 150. Image sensors 115A, 115B are each associated with predetermined baseline vector (length and direction) characterizing their different viewpoints. In an exemplary embodiment where image sensors 115A, 115B are on a mobile platform, the baseline vector may have a length of millimeters to tens of centimeters, depending on the form factor. In other embodiments, where image sensors 115A, 115B are separate infrastructure fixtures, baseline lengths may be on the order of meters. Additional image frames 151 having depth information may be collected over subsequent time intervals, for example generating 3D video.

Although two image sensors are illustrated in FIG. 1, any number of image sensors may be included in an array camera as embodiments herein are not limited in this respect. Alternative embodiments may also employ only a single image sensor. For single sensor embodiments, a baseline vector describing the relationship between the single image sensor (e.g., 115A) and light pattern projector 125 is employed to derive depth information. Projection LED source 130 may cast structured light, for example, that is collected by the image sensor and processed by any known technique to determine depth information for image frame 150 based on locations of discrete illumination points within a collected frame of image data and the known origin of the illumination points.

With multiple image sensors 115A and 115B, pattern projector 125 need not cast structured light, and in some exemplary embodiments, pattern projector 125 casts a fixed pattern of light, such as a pseudo-random light pattern 120 comprising a plurality of points of illumination (e.g., in the IR band) projected into camera FOV 116. In this example, projector field of illumination 111 is larger than camera FOV 116, and light pattern 120 may illuminate substantially all of camera FOV 116 over a first time increment during which sensors 115A, 115B are sampling light from scene 105. In some embodiments, a platform 101 includes a global shutter (not depicted) such that all pixels of a sensor array in each of image sensors 115A and 115B actively sample the illuminated scene concurrently. Other embodiments where platform 101 includes a rolling shutter (not depicted) are also possible.

Upon collecting image frame 150, depth information may be computed based at least in part on projected light pattern 120. For example, pixel correspondence may be deduced by determining disparity between discrete illumination points making up feature pattern 120. Such depth information may then be employed, for example, to assign segmentation labels to various segments in the scene. In the example illustrated in FIG. 1, three segments (background 155, subject 160 and subject 165) are identified from image frame 150 based, at least in part, on depth information determined from the feature pattern 120. The segmentation shown in FIG. 1 is, however, only one example of the type of depth processing enabled by light pattern 120.

Light pattern projector 125 includes a LED source 130. LED source 130 is generally an extended source, for example having a relatively wide emission angle (e.g., with lambertian radiation distribution having a half-emission cone angle of approximately 65°), and having a relatively wide emission spectrum (e.g., 4-20 nm). While the emission band may vary with implementation, in some examples LED source 130 emits within the NIR band (e.g., ~850 nm). With larger etendue than a laser source, LED source 130 may be relatively more difficult to manipulate to create a light pattern comprising the many thousands (e.g., 20K-100K) of illumination points advantageous for good depth processing. For a small form factor and low power consumption, LED source 130 advantageously includes far fewer emission elements (emitters) than illumination points (e.g., dots) projected onto scene 105, and a pattern mask 135 is relied upon to spatially modulate an intensity of the light into a pattern with suitable contrast. As described further below, pattern mask 135 may comprise elements that modulate amplitude and/or phase of light emitted by LED source 130. Although LED source 130 may comprise more than one emitter (e.g., an emitter array), in some exemplary embodiments LED source 130 includes only a single LED emitter that is to be powered at any given time to generate feature pattern 120. This is in contrast to an emitter array that might include an array of many emitters that are to be concurrently powered, each corresponding to an individual projector element, or "proxel," having some correspondence with one or more illumination points in feature pattern 120. While such emitter array implementations are possible, embodiments where pattern projector 125 comprises a single emitter enable an advantageously small form factor.

Light projector 125 further includes one or more projection lenses 140. Projection lenses 140 are to cast light modulated by pattern mask 135 onto scene 105 over a sufficiently large projection FOV 111. In exemplary embodiments, projection FOV 111 is at least 60°. As described further below, projection lens 140 and pattern mask 135 may be implemented as discrete optical elements, but may alternatively be integrated together. When integrated together, light projector 125 may have an advantageously small form factor and/or well-controlled performance.

Figure 2:
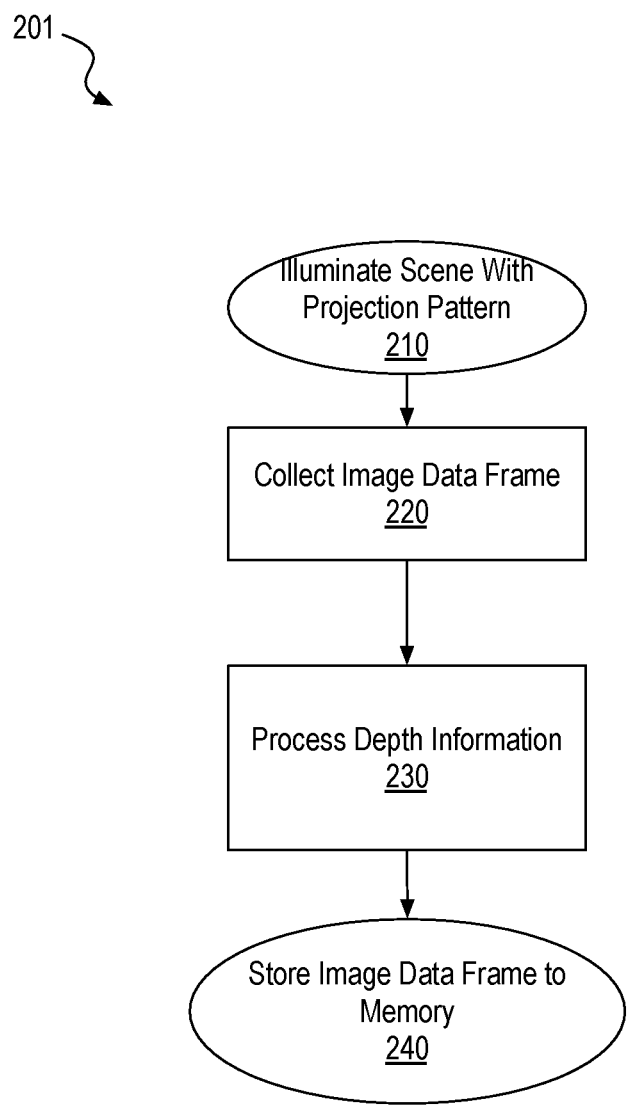
FIG. 2 is a method of LED pattern projection and image capture, in accordance with some embodiments.

FIG. 2 illustrates methods 201 of LED illuminated pattern projection in synchronization with image capture, in accordance with some exemplary embodiments. Methods 201 may be performed with a camera platform that includes a LED projector capable of casting a plurality of point of illumination upon a scene, such as one including LED pattern projector 125, introduced above. Methods 201 begin at block 210 where a projector in accordance with one or more embodiments is energized by any means (e.g., capacitor, battery, etc.). In exemplary embodiments, the projector is to concurrently illuminate multiple portions of a scene within the image sensor FOV, and the projector may advantageously illuminate substantially the entire scene within the image sensor FOV. In some exemplary embodiments, the projected illumination is a fixed pattern. In some other embodiments, the illumination is a spatially coded pattern, or a temporally coded pattern (e.g., structured or coded light projection). At block 210, a projector controller may initiate the illumination by driving a single LED source to emit light and illuminate the entire scene corresponding to that to be concurrently captured during block 220.

At block 220, image data is read out from the image sensor, for example as consecutive lines (e.g., rows) of a sensor array. In one exemplary embodiment, the image data includes pixel values (e.g., indicative of light intensity) for each of a plurality of color channels. The color channels may be in any color space. In some embodiments, the image data includes color information in the RGB color space. In further embodiments, the image data includes an NIR channel. The image data may be received into an image signal processor (ISP), for example.

Methods 201 continue at block 230 where the image data collected at block 220 is processed to determine associated depth information. In some embodiments, at least NIR data is processed to determine pixel correspondence between a plurality of image frames. In some examples, the depth information determined at block 230 is in the form of a depth map correlated with the image pixels, each having an image coordinate x,y associated with the image frame. In other embodiments, the depth information determined at block 230 is in the form of a disparity map correlated with the image pixels, each image pixel having an image coordinate x,y associated with the image frame. For some disparity embodiments, image data collected at block 220 may be accompanied by CM parameters, such as a camera focal length ($C_f$) and a camera baseline ($C_b$), from which disparity values for pixels in a first image (e.g., collected by a first sensor at block 220) may be estimated based on their correspondence with pixels in a second image (e.g., collected by a second sensor at block 220). Disparity estimation may be accomplished through any known technique or algorithm, as embodiments herein are not limited in this respect. As an alternative to determining disparity between two sensors, in some other embodiments where the origin of a feature in an illumination pattern is known (e.g., as with structured light) the disparity may be determined based on a known baseline between the LED pattern projector and a single image sensor. Methods 201 then complete at block 240 where depth information is stored to memory in association with corresponding pixel data, according to any suitable techniques.

Figure 3A:
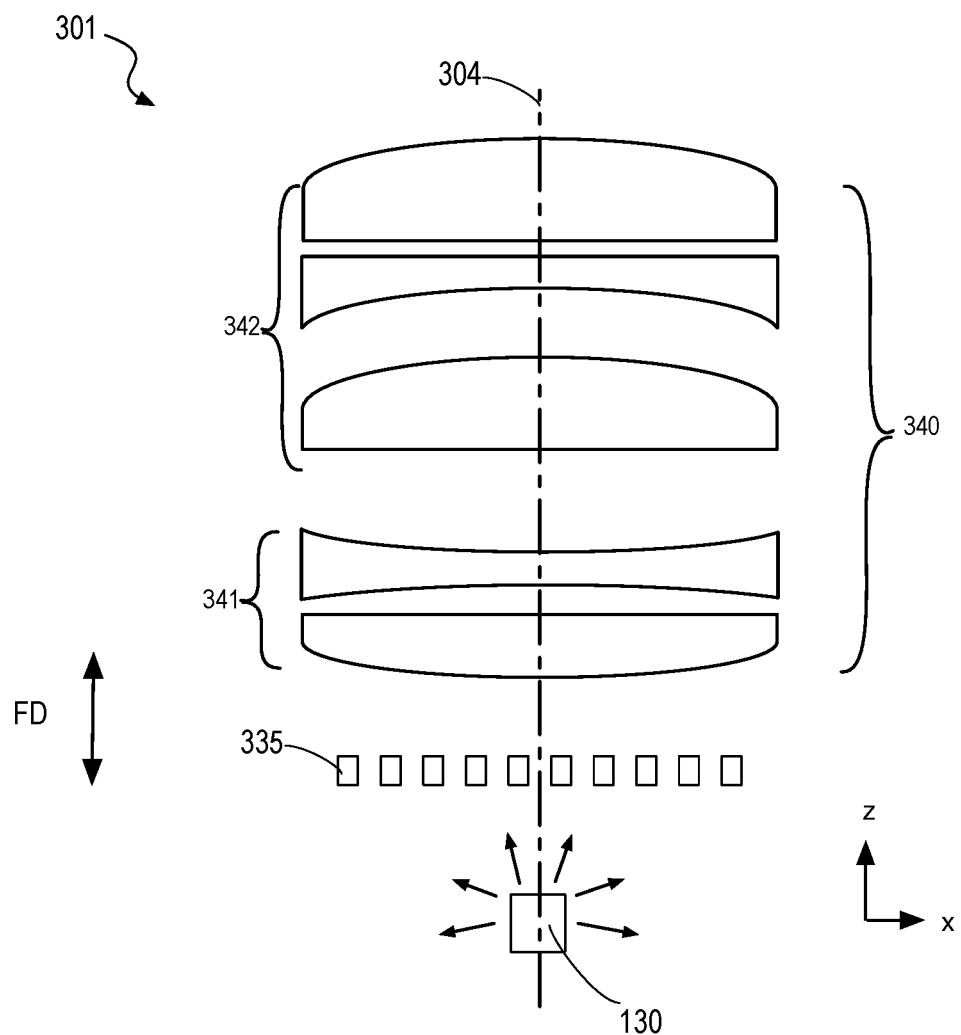
FIG. 3A is a schematic of a LED pattern projector, in accordance with some embodiments.

FIG. 3A is a schematic of a LED pattern projector 301, in accordance with some embodiments. LED pattern projector 301 may, for example, be employed as LED pattern projector 125 (FIG. 1), introduced above. In further reference to FIG. 3A, projector 301 includes a compound lens 340, comprising a plurality of simple lenses that may each be of any suitable shape, made of any materials having refractive indices known to be suitable for the purpose of collection and projection, and arranged one after the other along a common optical axis 304. Notably, compound lens 340 may be implemented as any number of discrete simple lenses or one or more monolithic compound lenses. In some exemplary embodiments, compound lens 340 includes at least one collector lens 341 proximal to LED source 130, and one projector lens 342 separated from LED source 130 by the collector lens 341. Collector lens 341 is to collect and collimate light emitted by LED source 130. Projector lens 342 is to project an image plane of collector lens 341 upon a scene over desired FOV (e.g., associated with an image capture device).

In the illustrated example, compound lens 340 comprises five lenses, but embodiments with two, three, four, or more than five lens, are also possible. The greater the number of lenses employed, the better the resolution of compound lens 340 at a given spatial frequency, and the higher the spatial intensity contrast (i.e., a high optical transfer function (OTF) and/or modulation transfer function (MTF)) a pattern may have for a given FOV. The number of optical elements employed in compound lens 340 may therefore depend, at least in part, on the FOV over which a pattern is to be projected. For example, to generate a high MTF pattern over a 70+° FOV, a compound lens 340 may require four lenses. For a significantly smaller FOV (e.g., 50°), a single compound optical element (e.g., a molded acrylic element) may be employed as both collector lens 341 and projector lens 342. Cost and/or form factor constraints of a mobile device, for example, may also limit compound lens 340 to four, or fewer, optical elements.

As noted above, pattern mask 135 may be an amplitude mask, a refractive mask comprising refractive elements, or a diffractive mask comprising diffractive elements (e.g. a grating). In the example shown in FIG. 3A, LED projector 301 includes an amplitude mask 335. Amplitude mask embodiments transmit only a portion of the light emitted from LED source 130 to generate a spatial intensity distribution on an image plane that may then be projected onto a scene to be illuminated based on that spatial intensity distribution. For such embodiments, the focal distance (FD) between amplitude mask 335 and collector lens 341 is an important parameter impacting MTF of projector 301. In some exemplary embodiments therefore, amplitude mask 335 is in close proximity (e.g., direct contact) with collector lens 341. For example, amplitude mask 335 may be printed, machined, or molded directly onto a surface of collector lens 341 proximal to LED source 130.

Amplitude mask 335 may have any suitable pattern, such as, but not limited to, a pseudo random feature pattern. The feature pattern in some embodiments has a 1:1 correspondence with a number of illumination points to be projected (e.g., 1:1 mask opening:reimaged illumination point). For example, amplitude mask 335 may be a dark field mask having low amplitude transmittance perforated with tens of thousands of holes having high amplitude transmittance. Such a mask may however significantly reduce net light flux projected to an illuminated scene. Hence, in some embodiments offering greater efficiency, amplitude mask 335 has a low amplitude transmittance feature count that is far below the projected illumination point count. For example, amplitude mask 335 may comprise less than 50,000 low-transmittance features, advantageously less than 10,000 low-transmittance features, and more advantageously less than 1,000 low-transmittance features. As the low-transmittance feature count decreases, the net transmittance is increased such that illumination efficiency of amplitude mask 335 is improved. In some embodiments, amplitude mask 335 has between 100 and 1,000 low-transmittance features, which may, for example, shape high-intensity illumination points to be other than what would occur if no amplitude mask was present and flood illumination from LED source 130 was merely projected onto a scene. For embodiments where amplitude mask 335 has fewer features than is to be projected upon a scene, one or more of collector lens 341 and projector lens 342 are to further replicate a base pattern defined by features of amplitude mask 335.

Figure 3B:
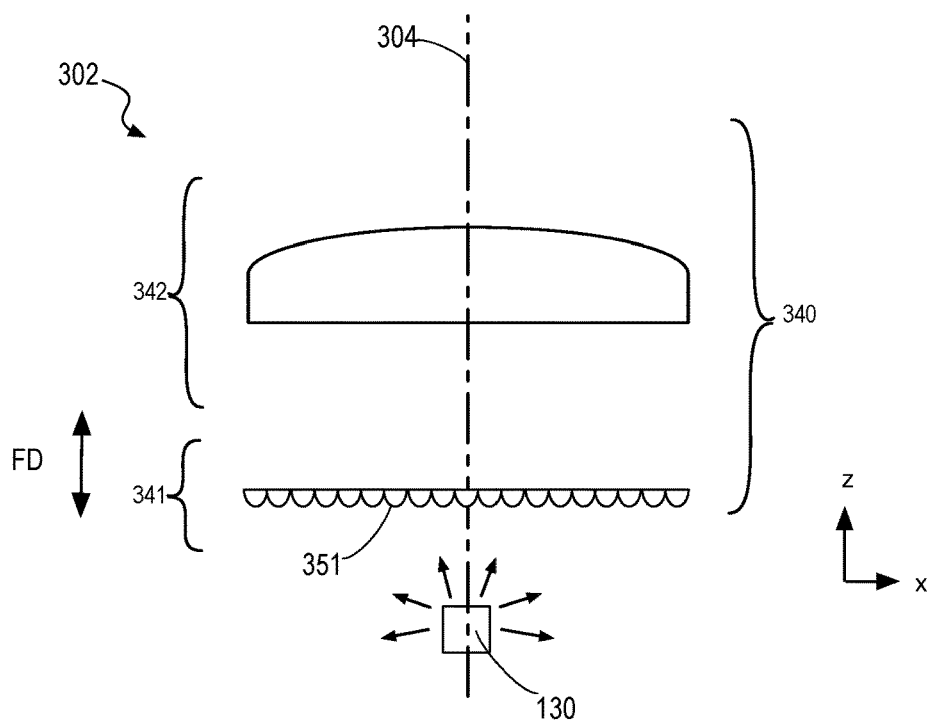
FIG. 3B is a schematic of a LED pattern projector, in accordance with some embodiments.

In some embodiments, an LED pattern projector employs a refractive mask. Such a mask may be employed in absence of an amplitude mask, or in combination with an amplitude mask. A refractive mask may also generate a spatial intensity distribution onto an image plane that may then be projected onto a scene. For such embodiments, the spatial intensity distribution may be generated without blocking any portion of the emission from LED source 130 such that illumination efficiency may be high. In further reference to FIG. 1, for some refractive mask embodiments, pattern mask 135 may be eliminated, or its function essentially integrated into compound lens 340. In FIG. 3B for example, an LED pattern projector 302 is illustrated, which may again be employed as LED pattern projector 125 (FIG. 1). As shown in FIG. 3B, collector 341 is a micro-lens array (MLA), comprising an array of lenslets 351. Each lenslet 351 may have any suitable shape with the illustrated example being plano-convex lenslets having convex surface curvature proximal to LED source 130. Each lenslet 351 will therefore collect light from LED source 130, which is to be reimaged as a base pattern onto an image plane beyond the planar side of lenslets 351. The cumulative pattern generated by the MLA may then be reimaged by projector lens 342. With the MLA providing patterned light collection, projector lens 342 may not require more than a single projection lens (e.g., a single plano-convex lens is depicted in FIG. 3B). The focal distance (FD) between the MLA and the LED source is an important parameter impacting MTF of projector 302. In some exemplary embodiments therefore, the MLA is in close proximity (e.g., direct contact) with a reference surface of LED source 130.

A collector MLA may include any number of lenslets 351. In some embodiments, the MLA includes no more than nine lenslets 351, each replicating a base illumination pattern. In some advantageous embodiments, the MLA includes at least twenty lenslets 351. In some more advantageous embodiments, the MLA includes at least one hundred lenslets 351. With a larger number of lenslets, an illumination pattern may be replicated a greater number of times permitting thousands of illumination points to be generated from a simpler base illumination pattern. For some embodiments, lenslets 351 are all substantially identical within the array. In other embodiments, the size (e.g., diameter) or refractive index of the individual microlenses is varied within the MLA, for example to affect the spatial intensity distribution the MLA pattern to be projected. Focal lengths and/or lens shape may also be modulated within the MLA, for example to modulate the efficiency of collection as needed to achieve a desired intensity distribution on an image plane of the MLA that can then be projected into a suitable pattern over a scene over some predetermined projector FOV.

Figure 3C:
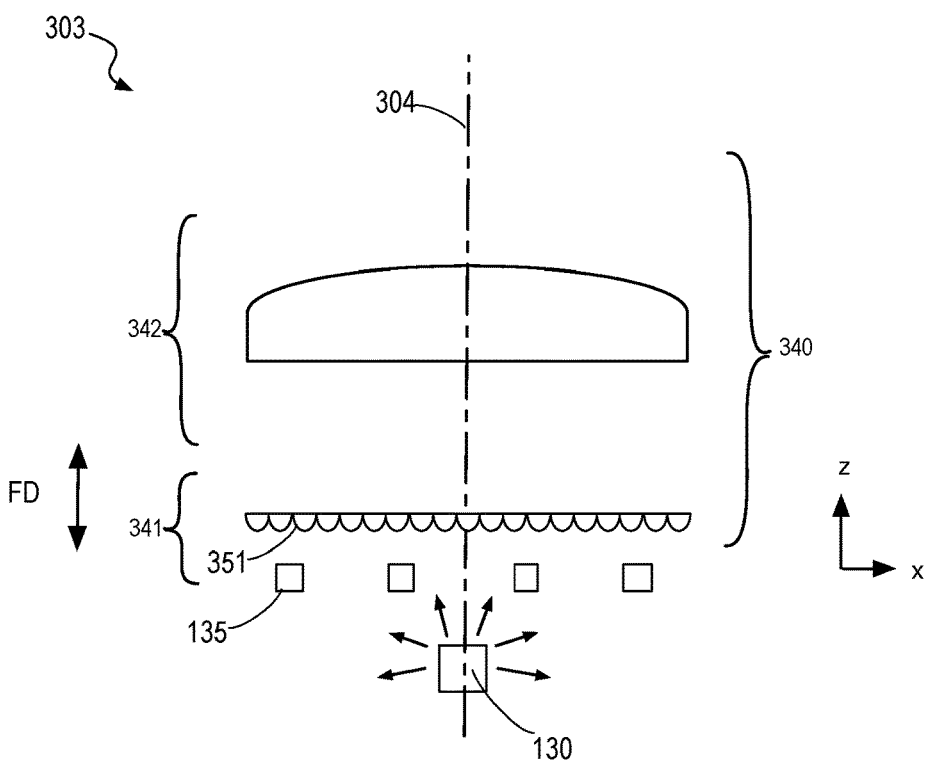
FIG. 3C is a schematic of a LED pattern projector, in accordance with some embodiments.

In some further embodiments, an LED pattern projector employs a refractive mask and an amplitude mask. The amplitude mask may, for example, be located between a MLA collector and an LED light source, for example to improve spatial intensity contrast of a pattern generated on an image plane of the MLA collector. In FIG. 3C for example, a LED pattern projector 303 is illustrated, which may again be employed as LED pattern projector 125 (FIG. 1). As shown in FIG. 3C, collector 341 comprises an array of lenslets 351 and amplitude mask 335 is between lenslets 351 and LED source 130. In this example, amplitude mask 335 may be a bright field mask with relatively large transmissive feature size having a lower count (e.g., 100-400 dots) and/or feature density (e.g., 100-400 dots/mm$^2$) than what is to be projected onto a scene. The fixed base pattern defined by amplitude mask 335 may be associated with an intensity distribution that is then replicated by each lenslet 351. The image planes of lenslets 351 are then reimaged onto a far-field scene by projector lens 342.

Figure 4A:
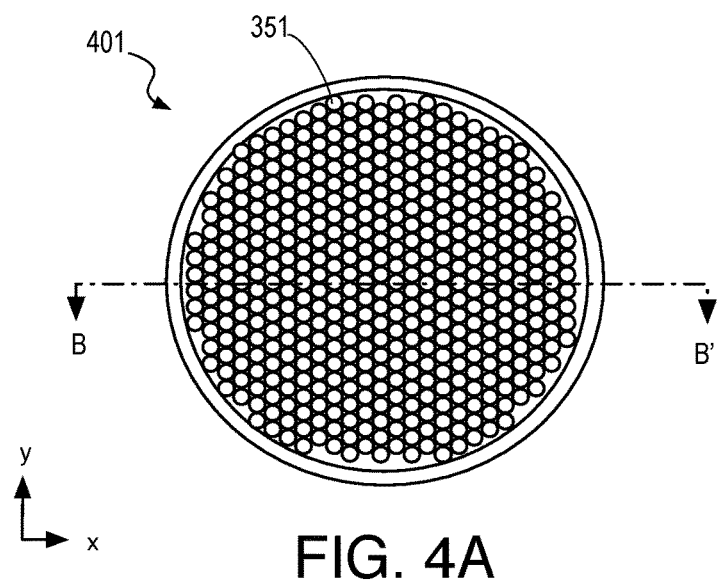
FIG. 4A is a plan view of a lenslet array that may be employed in a LED pattern projector, in accordance with some embodiments.

FIG. 4A is a plan view of a MLA collector 401 comprising a spherical array of plano-convex lenslets 351, in accordance with some embodiments. MLA collector 401 may be employed as collector lens 341 in LED projector 301, for example. As shown, MLA collector 401 is a monolithic array, which may have been manufactured according to any techniques known to be suitable for the purpose. MLA collector 401 may have any material composition known to be suitable for a MLA, as embodiments herein are not limited in this respect. In some exemplary embodiments, MLA collector 401 comprises an acrylic, or a siloxane (e.g., poly(dimethylsiloxane). In this example, many hundreds of lenslets are illustrated, however more or fewer may be employed, for example as a function of the resolution of each lenslet.

Figure 4B:
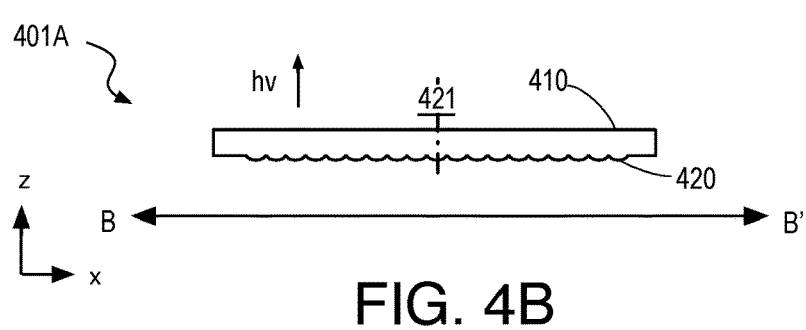
FIG. 4B is a cross-sectional view of a flat lenslet array that may be employed in a LED pattern projector, in accordance with some embodiments.
Figure 4C:
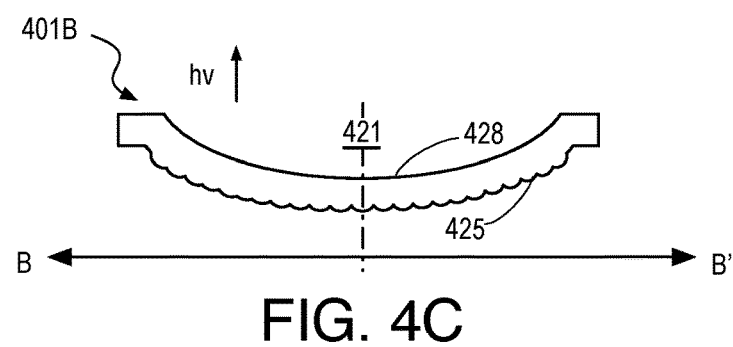
FIG. 4C is a cross-sectional view of a concave-convex lenslet array that may be employed in an LED pattern projector, in accordance with some embodiments.

FIG. 4B is a cross-sectional view of MLA collector 401B through the B-B' plane further illustrated in FIG. 4A, in accordance with some exemplary embodiments. MLA collector 401B has spherical symmetry about a central collector axis 421. MLA collector 401B has a planar arrayed convex lenslet surface 420 and a substantially planar surface 410. In some exemplary embodiments, arrayed convex surface 420 is to be proximal to a LED source (not depicted), while planar surface 410 is to be distal from the LED surface (and proximal to a projector lens). Arrayed surface 420 is depicted as substantially equidistant to planar surface 410 over a diameter of MLA collector 401A, however arrayed surface 420 may have any best form for the incoming illumination, so as to minimize spherical aberration. For example, an arrayed surface may have a compound convex shape over a diameter of the MLA collector lens in addition to the convex shape over a diameter of each lenslet (i.e., a fly's eye compound collector lens architecture). An MLA collector may also have concave-convex architecture. For example, as further illustrated in FIG. 4C. MLA collector 401C has a convex lenslets 425 array over a convex surface proximal to a LED source (not depicted), and a smooth concave surface 428 distal from the LED surface (and proximal to a projector lens).

Figure 4D:
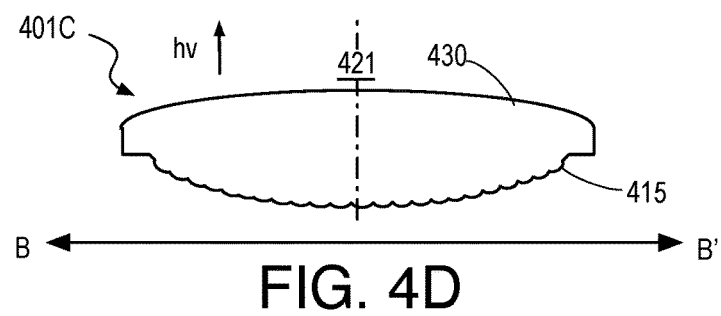
FIG. 4D is a cross-sectional view of a bi-convex lenslet array that may be employed in an LED pattern projector, in accordance with some embodiments.

In some further embodiments, a refractive collector mask and a projector lens are implemented with a single optical element (e.g., a molded element). For example, a MLA collector (e.g., comprising convex lenslets) may be molded into a convex or bi-convex lens form to integrate the collector with the projector. FIG. 4D, for example, is a cross-sectional view (through the B-B' plane further illustrated in FIG. 4A) of a pattern projection lens 401C form including both a MLA collector and a convex projection lens surface, in accordance with some alternative bi-convex embodiments. As shown in FIG. 4D, the MLA collector comprises a convex array surface 415 that has long-range convex curvature over a diameter of lens 401C in addition to a short-range convex curvature over a diameter of each lenslet. For the illustrated embodiments, lens 401C depicts a fly's eye architecture. Lens 401C may further comprise a second convex surface 430, for example having a curvature suitable for projecting the micropattern replicated by the fly's eye collector lens surface. Convex array surface 415 may again be proximal to a LED source (not depicted), while convex surface 430 is distal from the LED surface.

In some alternative embodiments, a LED pattern projector employs a diffractive optical element (DOE) to generate a spatial intensity distribution of illumination from a LED source that is suitable for projection upon a scene. The DOE may be employed alone, or in combination with one or more of an amplitude mask and a refractive mask. A DOE may include any suitable phase elements that may produce any desired intensity distribution through interference and/or diffraction. Although DOEs are most often employed with collimated, coherent illumination, for example of the type most typical of a laser source, broadband DOEs have more recently also been designed for wider bandwidth sources, such as LED sources. For example, DOEs of the type employed in some LED-based optical transmitters are able to shape diffraction patterns into polygons within the RGB band. Such polygons may then be reimaged onto a far-field scene, for example substantially as described elsewhere herein.

For a DOE, phase shifts may be controlled through the use of step-shaped phase metastructures distributed sequentially over a lens. The phase metastructures may, for example, have a surface roughness in the nanometer range, and the feature height of the phase steps in diffractive elements may be below the micrometer scale. DOEs may therefore be considered "flat" optical elements because they can be much thinner than conventional optical elements. For example, flat lenses having thicknesses of only tens or hundreds of nanometers (nm) have been recently developed. A DOE may include any metasurface that comprises a plurality of surface structures spatially arrayed over a substrate, such as, but not limited to, polished quartz, or another material having similar flatness. The nanostructures may also be referred to as nanoantennas because they are each capable of functioning as a resonant optical antenna, which allows the metasurface to manipulate optical wave-fronts (e.g., inducing a phase delay, which may be precisely tuned over a footprint of the array). A given nanostructure array may have a different focal length for different wavelengths. Hence, in some embodiments suitable for LED pattern projection, a LED pattern projector includes a plurality of flat lenses, each tuned for a different center source wavelength.

Figure 5A:
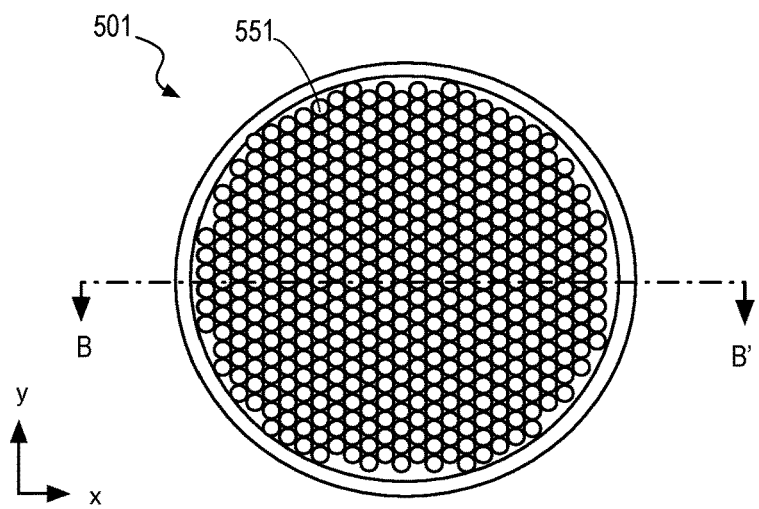
FIG. 5A is a plan view of a lenslet array that may be employed in an LED pattern projector, in accordance with some embodiments.

In some embodiments, a LED pattern projector employs a projector comprising a MLA to reimage and replicate an illumination pattern collected from a LED source. FIG. 5A is a plan view of a lenslet array that may be employed in an LED pattern projector, in accordance with some embodiments. In this example, many hundreds of lenslets are illustrated, however more or fewer may be employed, for example as a function of the resolution of each lenslet. MLA projector 501 includes a spherical array of convex lenslets 551, in accordance with some embodiments. MLA projector 501 may be employed as projector lens 342 in LED projector 301, for example. MLA projector 501 may be monolithic and comprise any suitable material(s) manufactured according to any techniques known to be suitable for the purpose. In some exemplary embodiments, MLA projector 501 comprises an acrylic, or a siloxane (e.g., poly(dimethylsiloxane). In this example, many hundreds of lenslets are illustrated, however more or fewer may be employed, for example as a function of the resolution of each lenslet.

MLA projector 501 may include any number of lenslets 551. In some embodiments, MLA projector 501 includes no more than nine lenslets 551. In some advantageous embodiments, MLA projector 501 includes at least twenty lenslets 551. In some more advantageous embodiments, MLA projector 501 includes at least one hundred lenslets 551. For some embodiments, lenslets 551 are all substantially identical within the array. In other embodiments, the size (e.g., diameter) or refractive index of the individual microlenses may be varied within the MLA, for example to affect the spatial intensity distribution the MLA pattern to be projected. Focal lengths and/or lens shape may also be modulated within the MLA, for example to modulate the efficiency of collection as need to achieve a desired illumination intensity distribution over a scene within some predetermined FOV.

Figure 5B:
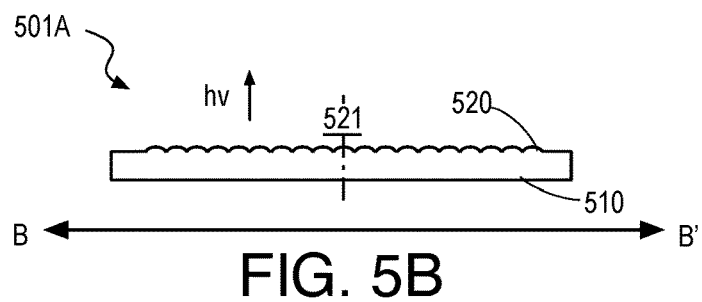
FIG. 5B is a cross-sectional view of a flat lenslet array that may be employed in an LED pattern projector, in accordance with some embodiments.
Figure 5C:
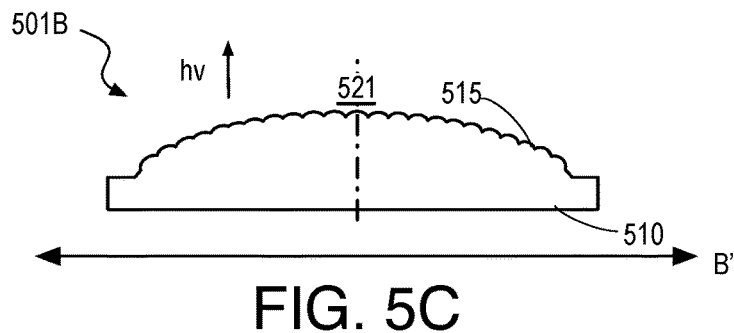
FIG. 5C is a cross-sectional view of a plano-convex lenslet array that may be employed in an LED pattern projector, in accordance with some embodiments.
Figure 5D:
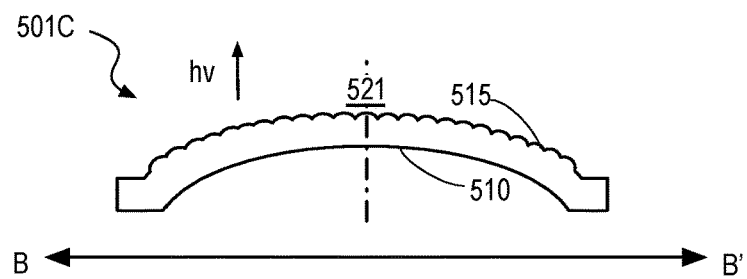
FIG. 5D is a cross-sectional view of a concave-convex lenslet array that may be employed in an LED pattern projector, in accordance with some embodiments.

FIG. 5B is a cross-sectional view of MLA projector 501A through the B-B' plane further illustrated in FIG. 5A. MLA projector 501A is a first example of MLA projector 501, and has spherical symmetry about a central projector axis 521. As shown in FIG. 5B, MLA projector 501B has an arrayed convex surface 520 and a substantially planar surface 510, in accordance with some exemplary embodiments. For projection, arrayed convex surface 520 is to be distal from a LED source (not depicted), while surface 510 is proximal to the LED surface. Arrayed surface 520 is depicted as substantially equidistant from planar surface 510 over the diameter of MLA projector 501, however arrayed surface 510 may have any best form for the incoming illumination, for example so as to minimize spherical aberration. The arrayed surface may, for example, have a convex shape over a diameter of a MLA projector, as is further illustrated in FIG. 5C for MLA projector 501B. For such embodiments, a convex array surface 515 has long-range convex curvature over a diameter of MLA projector 501B, in addition to a short-range convex curvature over a diameter of each lenslet of convex array surface 515. Hence, MLA projector 501B has a fly's eye architecture. Convex array surface 515 is again to be distal from a LED source with (planar) surface 510 proximal to the LED source. The arrayed surface may also have a concave-convex shape over a diameter of a MLA projector, as is further illustrated in FIG. 5D for MLA projector 501C. For such embodiments, convex array surface 515 has long-range convex curvature over a diameter of MLA projector 501C. In this embodiment however, surface 510 (proximal to the LED source) is concave rather than planar.

In some embodiments, a MLA projector is integrated with one or more of an amplitude mask, refractive mask, or diffractive mask. For some such embodiments where mask features are printed, machined, or molded into a (collector) surface of the MLA, the focal distance between the mask and the lenslet array can be advantageously fixed to a desired predetermined value. FIGS. 6A, 6B, 6C, and 6D are cross-sectional views of masked lenslet arrays that may be employed in LED pattern projectors, in accordance with some embodiments.

Figure 6A:
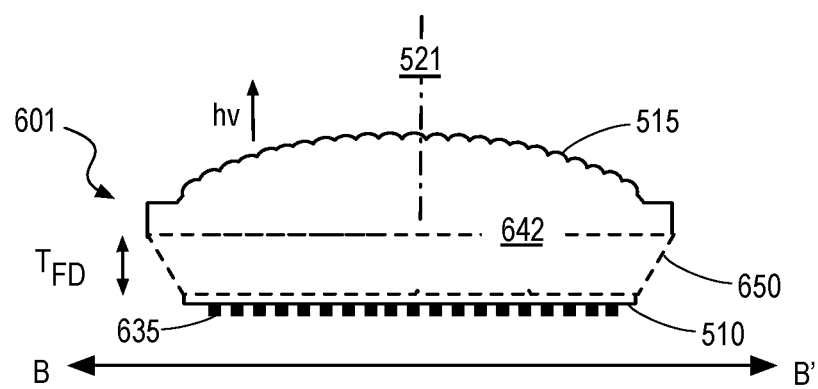
FIGS. 6A, 6B, 6C, and 6D are cross-sectional views of masked lenslet arrays that may be employed in LED pattern projectors, in accordance with some embodiments.

In the example shown in FIG. 6A, a mask material 635 is in contact with a projector lens material 642. Lens material 642, may for example, comprise an acrylic, or a siloxane (e.g., poly(dimethylsiloxane). Mask material 635 has a different composition than lens material 642. For some exemplary amplitude mask embodiments where lens material 642 is a first material transmissive over a band emitted by an LED source, mask material 635 may be one or more second materials that are significantly less transmissive (e.g., opaque to the band emitted by an LED source) than lens material 642. For some exemplary refractive or diffractive mask embodiments where lens material 642 is a first material having a first refractive index over a band emitted by an LED source, mask material 635 may be one or more second materials that are also transmissive over the band emitted by an LED source. The second material(s) however have a second refractive index over the emission band that provides a suitable index contrast with lens material 642. Mask material 635 may, for example, be laminated, printed, or otherwise physically applied to surface 510 (proximal to an LED source). Mask material 635 may contain a pigment delivered in a carrier (e.g., an ink), for example. The ink may be directly printed onto lens surface 510 by any suitable process to define a predetermined mask feature pattern (e.g., 20×20 dot/mm$^2$). In other embodiments, a continuous mask material may be deposited onto lens surface 510 as a thin film, a spin-on, or a dry film laminate. The mask material may then be photolithographically patterned, or chemically etched according to a photolithographically defined sacrificial mask, to expose a portion of lens surface 510 and thereby define the mask feature pattern.

In the example shown in FIG. 6A, projector lens material 642 is molded to have a convex lenslet array surface 515, for example substantially as described above. Projector lens material 642 is further molded to have a sidewall 650 of any thickness $T_{FD}$ that defines a suitable working distance between the lenslet array surface 515 and mask 635. The use of dashed line in FIG. 6A is to emphasize sidewall 650 may define any thickness $T_{FD}$.

Figure 6B:
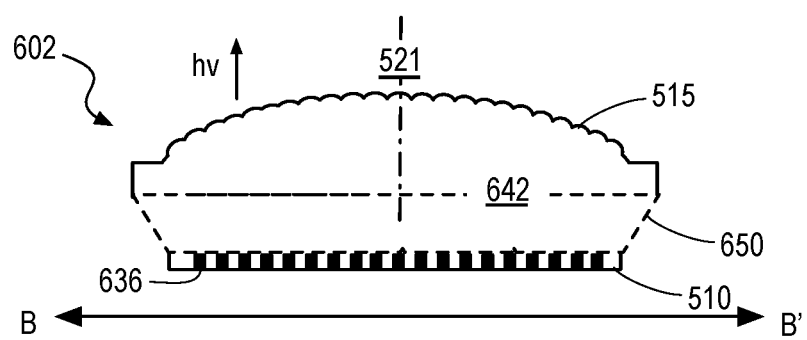

In the example shown in FIG. 6B, a mask material 636 is embedded within projector lens material 642. Mask material 636 again has a different composition that projector lens material 642. For some exemplary amplitude mask embodiments where lens material 642 is a first material that has high transmittance over a band emitted by an LED source, mask material 636 may be one or more second materials that have significantly lower transmittance (e.g., opaque to the band emitted by an LED source) than lens material 642. For some exemplary refractive or diffractive mask embodiments, mask material 635 may again be one or more second materials that are also transmissive over the band emitted by an LED source, but have a second refractive index that provides a suitable index contrast with lens material 642. Mask material 636 may be written into surface 510, for example. Mask material 636 may be a conversion product that reduces amplitude transmittance within a portion of lens material 642. In some embodiments, lens material 642 may be burned (e.g. with a suitable laser) to define a predetermined feature pattern (e.g., 20×20 dot/mm$^2$) embedded within lens material 642.

Figure 6C:
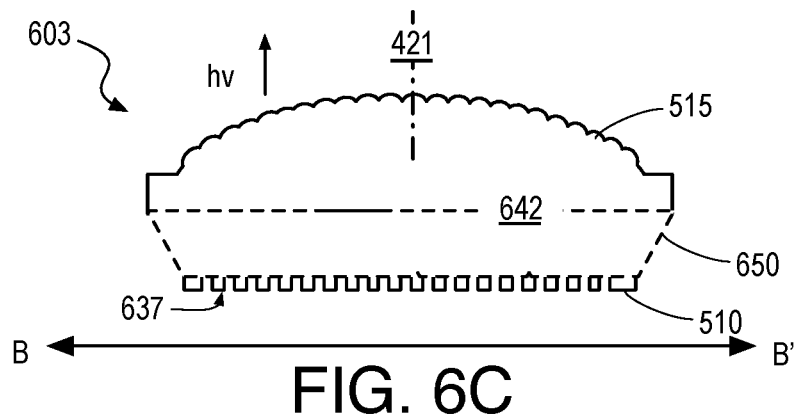
Figure 6D:
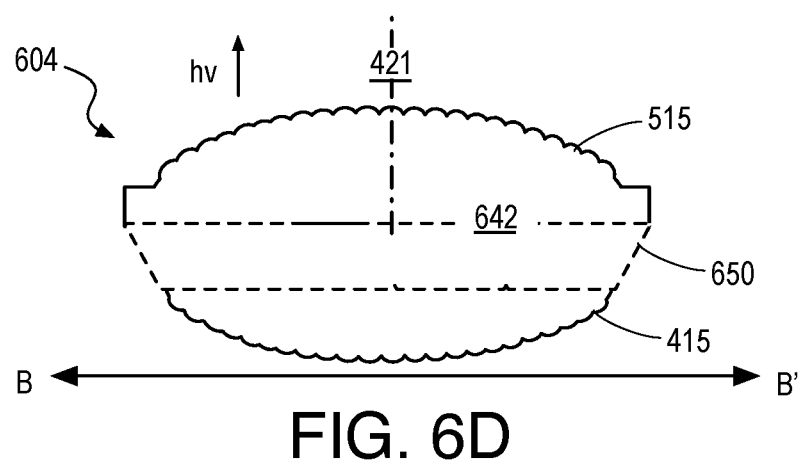

In the example shown in FIG. 6C, refractive and/or diffractive mask features 637 are machined into lens material 642. For such embodiments, lens material 642 is to both generate a spatial intensity distribution (e.g., with refractive and/or diffractive mask features 637), and project that spatial intensity distribution onto an illuminated scene (e.g., with convex array surface 515). In the example shown in FIG. 6D, refractive and/or diffractive mask features 638 are molded into lens material 642. A collector lens surface and a projector lens surface having any of the features described individually elsewhere herein may be machined into and/or molded from a homogenous material, for example.

Figure 7A:
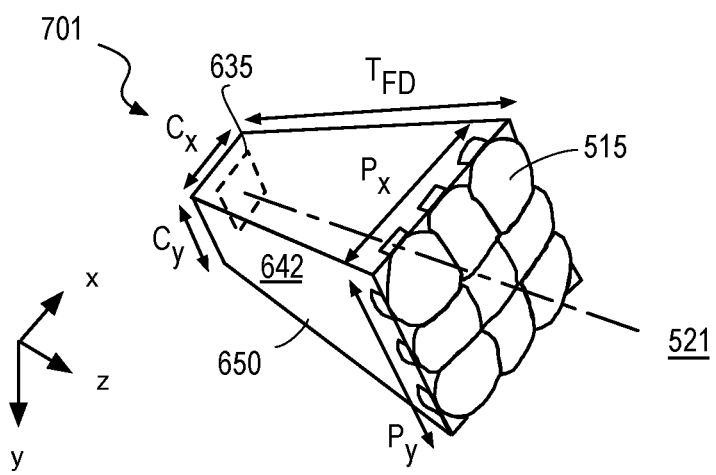
FIGS. 7A and 7B are isometric views of a pattern projector including a pattern mask and lenslet array, in accordance with some embodiments.
Figure 7B:
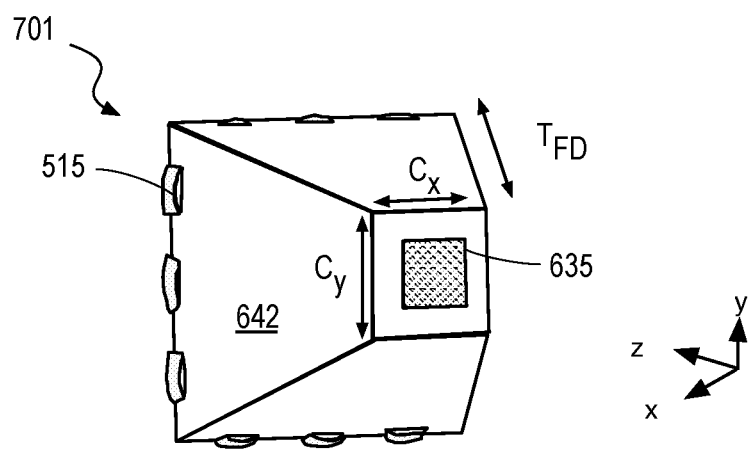

Notably, a pattern projector in accordance with embodiments herein need not have spherical symmetry and may have a variety of customizable form factors. FIGS. 7A and 7B are isometric views of a pattern projector 701 that includes a pattern mask and a lenslet array, in accordance with some embodiments. As shown in FIGS. 7A and 7B, pattern projector 701 includes mask 635 at a first (collector) end. Mask 635 occupies only a portion of a collector area having first lateral dimensions $C_x$ and $C_y$. Pattern projector 701 is in the form of a trapezoidal prism with lateral dimensions $C_x$ and $C_y$ being smaller than second lateral dimensions $P_x$ and $P_y$ associated with a second (projector) end. The collector and projector ends are separated by a volume further defined by sidewall 650 that has a length defining thickness $T_{FD}$. In the illustrated example, $T_{FD}$ is significantly longer than $C_x$, $C_y$, $P_x$, or $P_y$. Although $T_{FD}$ may vary, for the radius of curvature and refractive index of material 642, $T_{FD}$ is between 3 and 7 times $C_x$ (or $C_y$). At the projector end, is convex microlenslet array (MLA) surface 515 comprising a square (e.g., 3×3) array of projection lenslets. The nine lenslets are arranged with the substantially square projector end defined by lateral dimensions $P_x$ and $P_y$. As shown in FIG. 7B, portions of lenslet array surface 515 extend slightly beyond flat surfaces of the trapezoidal prism.

Figure 7C:
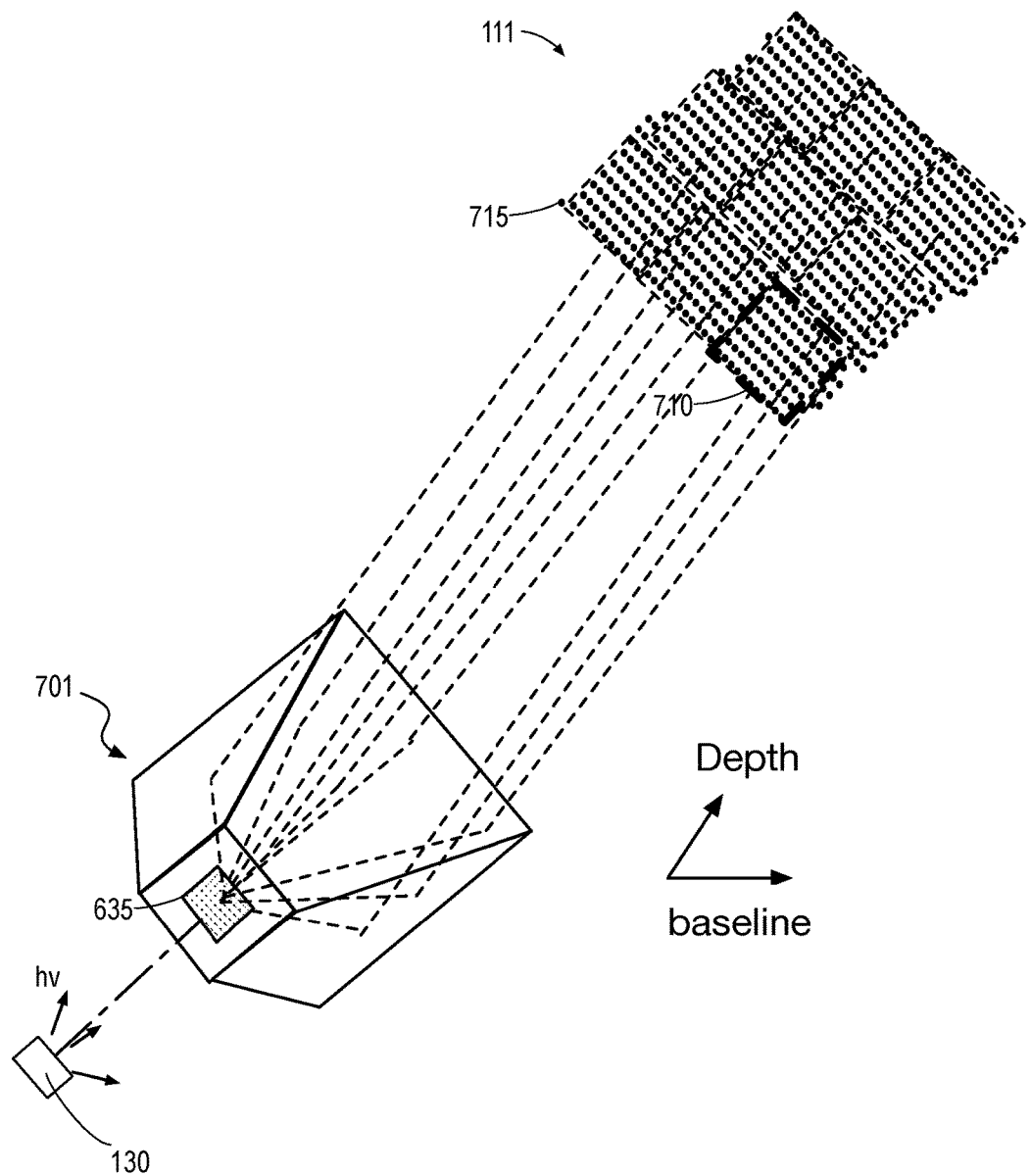
FIG. 7C is a schematic of LED pattern projection with a masked lenslet array, in accordance with some embodiments.

FIG. 7C is a schematic of LED pattern projection with a pattern projector 701, in accordance with some embodiments. In the example shown, the intensity of light emitted from LED source 130 is spatially modulated by mask material 635. The resulting spatial intensity distribution is a base micropattern that is reimaged by pattern projector 701 to illuminate a scene within field of illumination 111. In the example shown, a fly's eye projector lens architecture replicates the base micropattern over multiple (e.g., nine) projected pattern regions 710, each region comprising illumination points 715 associated with the micropattern. Within each of regions 710 is a pattern projection from one lenslet of MLA projector 501. Hence, mask material 635 with a given spatial intensity distribution (e.g., 20×20 illumination points/mm$^2$) may generate a micropattern on an image plane of pattern projector 701, and each lenslet of pattern projector 701 (e.g., a 3×3 lens array) may reimage, or project, the micropattern over a depth to generate a composite projection filling projector FOV 111. Although a 3×3 lens array is for the sake of clarity, larger arrays (e.g., 10×10, 100×100, etc.) may be similarly employed.

Figure 8:
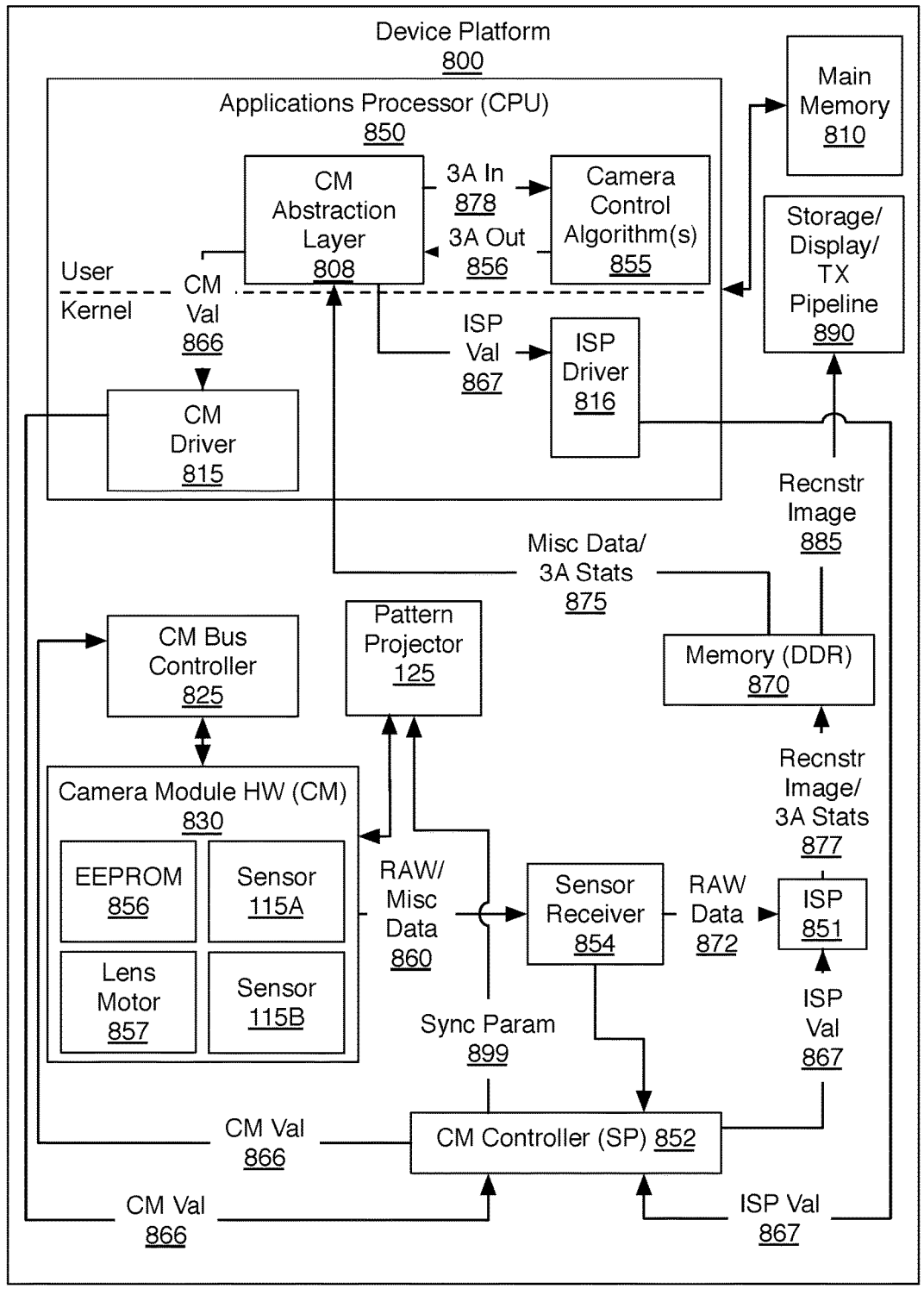
FIG. 8 is device platform including a camera and a LED pattern projector, in accordance with some embodiments.

FIG. 8 is device platform 800 including camera module hardware (CM) 830 and a pattern projector 125, in accordance with some embodiments. In the illustrated embodiment, CM 830 further includes EEPROM 856, optional lens motor(s) 857, and image sensors 115A, 115B.

Image sensor 115A may have any of the properties described elsewhere herein. CM 830 may have a number of control registers (e.g., 16-bit) addressable for example, through a camera control bus with an 8-bit address. Control registers of CM 830 may be programmed for example through an I$^2$C serial interface managed by camera control bus controller 825 (e.g., an I$^2$C controller).

CM 830 is to output image data 860. This data may include a description of the CM control parameters (e.g., exposure parameters such as exposure time, analog gain, digital gain, etc.) that were in effect during collection of the raw image data. Image data 860 is passed to a sensor receiver 854 that supports the streaming protocol employed by CM 830, such as a MIPI or other input protocol. Sensor receiver 854 is further to output raw image data 872 to one or more image signal processor (ISP) 851.

ISP 851 may receive and analyze the raw image data 872 during the horizontal and/or vertical blanking periods associated with CM 830. During raw image data processing, ISP 851 may perform one or more of computation of depth information, noise reduction, pixel linearization, and shading compensation, for example. ISP 851 may also perform resolution reduction, Bayer demosaic, and/or vignette elimination, for example. ISP 851 may also calculate image statistics information. Image statistics may include luminance/chrominance values and averages, luminance/chrominance high frequency and texture content, motion content from frame to frame, any other color content values, picture statistical data regarding deblocking control (for example, information controlling deblocking/non-deblocking), filter response grid, and RGB histograms, etc. ISP 851 may be compatible with video codecs, such as H.264/Advanced Video Coding (AVC) or High Efficiency Video Coding (HEVC), JPEG. etc., which may be utilized to post-process YUV data and generate reconstructed image data and calculated 3A statistics 877. Reconstructed image data and calculated 3A statistics 877 are stored in memory 870 (e.g., a double data rate (DDR), or other suitable memory). Reconstructed image data 885 may then be read out to one or more of a storage, display pipeline or transmission pipeline 890, to store display, or transmit a representation of collected frames.

3A statistics 875 may be accessed from memory 810 by applications processor 850 for further analysis, for example during a 3A control loop iteration. In the exemplary embodiment, applications processor 850 instantiates an operating system including a user space and a kernel space. Applications processor 850 may have many functions within a device platform beyond camera control. Applications processor 850 may be a large vector processor with access to main memory 810. Applications processor 850 is to execute camera control algorithm(s) 855, based on for example 3A input 877 received through CM abstraction layer 808. CM abstraction layer 808 may be any hardware abstraction layer configured for the particular operating system instantiated. CM abstraction layer 808 may for example handle compatibility between third-party 3A control algorithms and CM 830, and/or ISP 851.

Execution of CCA 855 may further entail accessing at least one of an automatic exposure or automatic white balance library stored in main memory 810 to generate CM control parameter values. In one exemplary AEC embodiment, execution of CCA 855 entails performing an exposure calculation that generates target total exposures and corresponding frame numbers. The target total exposures are included in 3A output 856 passed to CM abstraction layer 808. CM abstraction layer 808 passes values in 3A output 856 associated with CM 830 as CM control parameter values 866 to CM driver 815. CM abstraction layer 808 passes values in 3A output 856 associated with ISP 851 as ISP control parameter values 867 to ISP driver 816.

CM driver 815 passes CM control parameter values 866 to CM controller 850. ISP driver 816 likewise passes ISP control parameter values 867 to CM controller 850 where the values are queued and sequentially dispatched as CM parameter values 866 to CM bus controller 825. CM bus controller 825 writes CM values 866 to a CM register in synchronization with actions of CM 830 associated with exposing a next frame, and consecutive frames thereafter. CM controller 852 is further to queue ISP values 867 and sequentially dispatches them to ISP 851.

In an exemplary embodiment, CM controller 850 is further to communicate sync parameters 899 to pattern projector 125. Projector 125 includes an LED source, a mask to spatially modulate intensity of light emitted by the LED, and one or more projector lenses, for example as described elsewhere herein. Sync parameters 899 may be based on CM parameters values 866. For example, sync parameters 899 may include an indication of integration time that will be used by sensor array 115A for an upcoming frame collection. Sync parameters 899 may specify a LED emitter duty cycle, or otherwise specify an illumination time that is to be employed when CM 830 subsequently triggers projector 125. Sync parameters 899 may further specify a LED emitter peak power level that is to be employed when CM 830 subsequently triggers projector 125. Although illustrated as a component external to CM 830, projector 125 may instead be a component of CM 830. For such embodiments, CM values 866 may specify a projector LED duty cycle or otherwise specify an illumination time when projector 125 is subsequently triggered.

Figure 9:
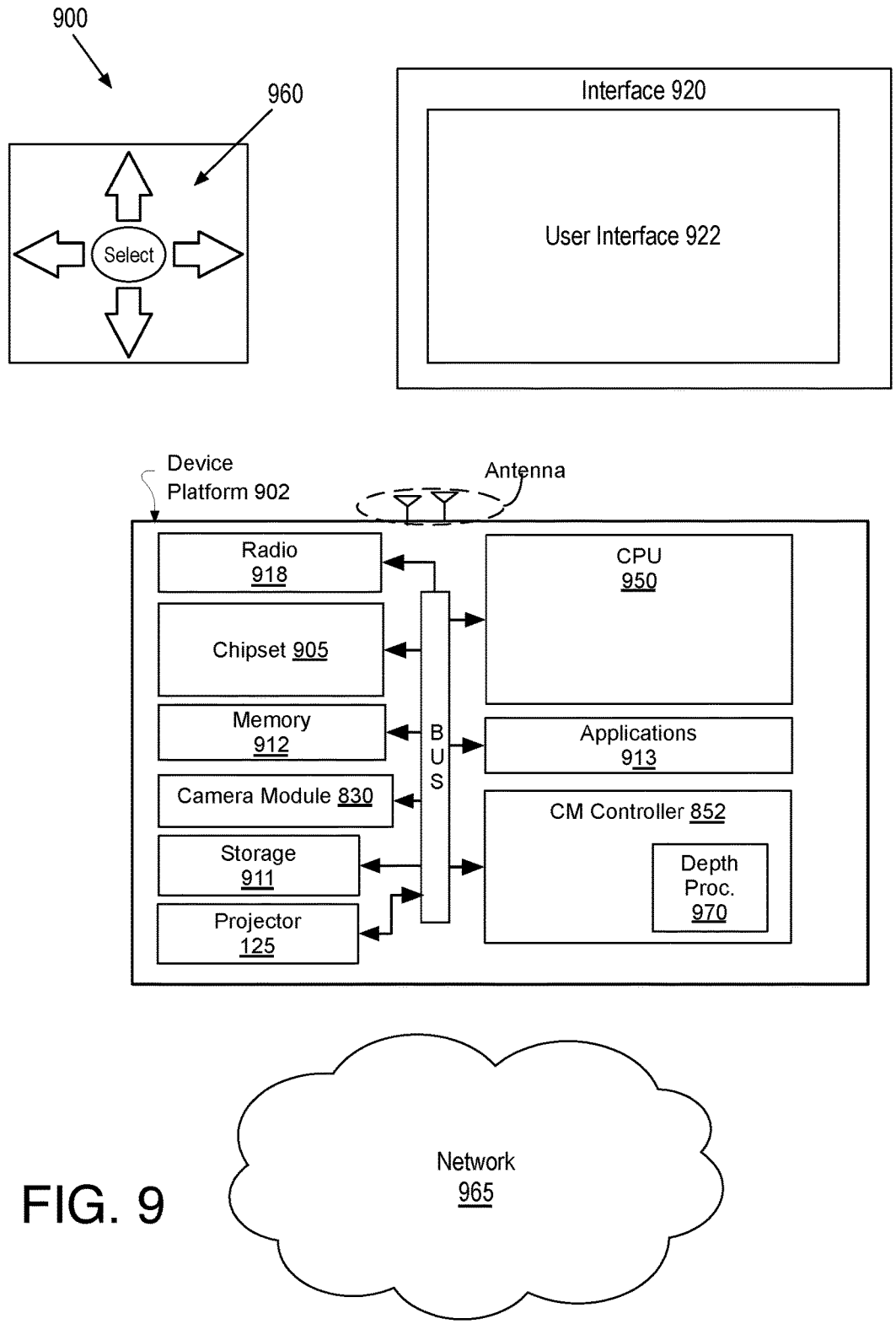
FIG. 9 is a diagram of an exemplary system employing a camera a LED pattern projector, in accordance with some embodiments.

FIG. 9 is an illustrative diagram of an exemplary system 900, in accordance with embodiments. System 900 may be a mobile device although system 900 is not limited to this context. For example, system 900 may be incorporated into a laptop computer, ultra-laptop computer, tablet, touch pad, portable computer, handheld computer, palmtop computer, cellular telephone, smart device (e.g., smart phone, smart tablet or mobile television), mobile internet device (MID), messaging device, data communication device, and so forth. System 900 may also be an infrastructure device. For example, system 900 may be incorporated into a large format television, set-top box, desktop computer, or other home or commercial network device.

System 900 includes a device platform 902 that may implement all or a subset of the various camera and illumination projection methods as well as any of the camera control platforms described above. CPU 950 may include logic circuitry to generate a frame-based series of control parameters for controlling CM 830 and projector 125. In some embodiments, one or more computer readable media may store instructions, which when executed by CPU 950, cause the processor to generate a frame-based series of control parameters for controlling CM 830 and projector 125. One or more image frame exposed by CM 830 using light projection determined by CPU 950 may then be stored in memory 912.

In embodiments, device platform 902 is coupled to a human interface device (HID) 920. Platform 902 may collect raw image data with CM 830, which is processed based on depth information (e.g., with depth processor 970), and output to HID 920. A navigation controller 960 including one or more navigation features may be used to interact with, for example, device platform 902 and/or HID 920. In embodiments, HID 920 may include any television type monitor or display coupled to platform 902 via radio 918 and/or network 965. HID 920 may include, for example, a computer display screen, touch screen display, video monitor, television-like device, and/or a television.

Under the control of one or more software applications 913, device platform 902 may display user interface 922 on HID 920. Movements of the navigation features of controller 950 may be replicated on a display (e.g., HID 920) by movements of a pointer, cursor, focus ring, or other visual indicators displayed on the display. For example, under the control of software applications 913, the navigation features located on navigation controller 960 may be mapped to virtual navigation features displayed on user interface 922.

Device platform 902 may include any combination of projector 125, CM 830, chipset 905, processor 950, controller 960, memory 912, storage 911, applications 913, and radio 918 known in the art. Chipset 905 may provide intercommunication among projector 125, CM 830, processor 950, controller 850, memory 912, storage 911, applications 913 and radio 918.

Processor 950 may be implemented as one or more Complex Instruction Set Computer (CISC) or Reduced Instruction Set Computer (RISC) processors; x86 instruction set compatible processors, multi-core, or any other microprocessor or central processing unit (CPU). Memory 912 may be implemented as a volatile memory device such as, but not limited to, a Random Access Memory (RAM), Dynamic Random Access Memory (DRAM), or Static RAM (SRAM). Storage 911 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. Radio 918 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 918 may operate in accordance with one or more applicable wireless standards versions.

In embodiments, system 900 may be implemented as a wireless system, a wired system, or a combination of both. When implemented as a wireless system, system 900 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 900 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Pattern projection and/or camera architectures described herein may be implemented in various hardware architectures, cell designs, or "IP cores."

Figure 10A:
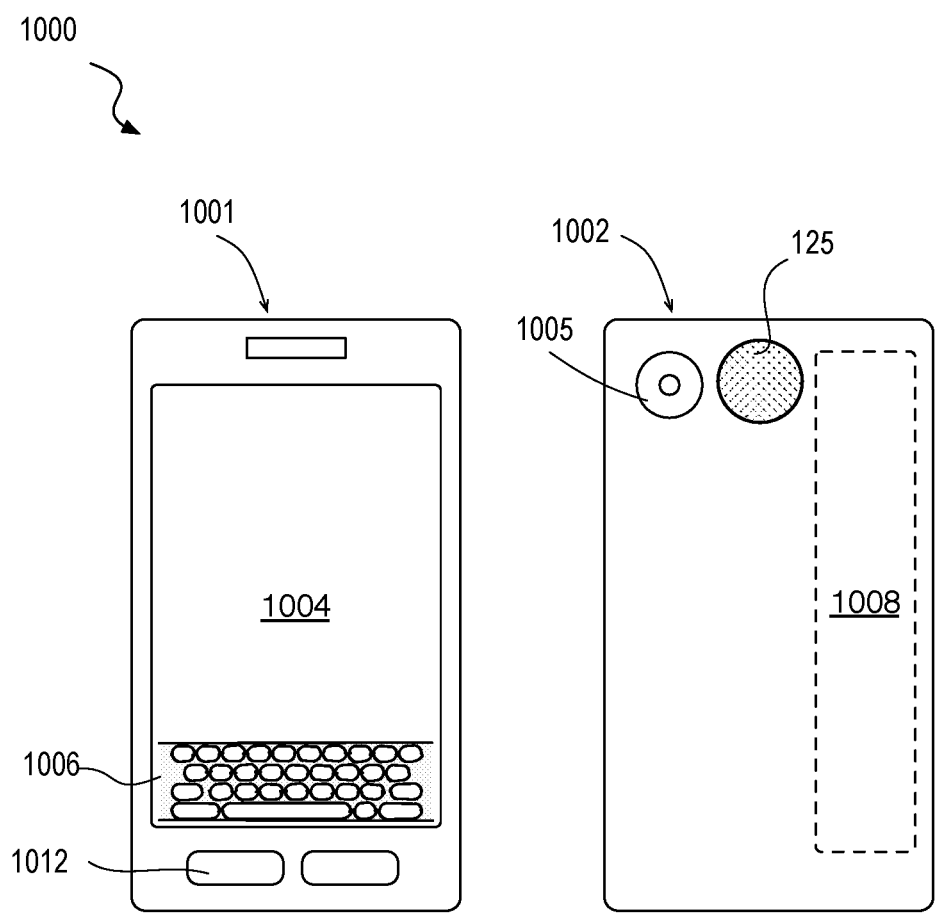
FIG. 10A is a diagram of an exemplary mobile handset platform including a camera and a LED pattern projector, in accordance with some embodiments.

As described above, system 900 may be embodied in varying physical styles or form factors. FIG. 10A illustrates embodiments of a mobile handset device 1000 in which system 900 may be embodied. In embodiments, for example, device 1000 may be implemented as a mobile computing device having wireless capabilities. A mobile computing device may refer to any device having a processing system and a mobile power source or supply, such as one or more batteries, for example. Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smartphone, tablet or smart television), mobile internet device (MID), messaging device, data communication device, and so forth. Examples of a mobile computing device also may include computers and/or media capture/transmission devices configured to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 10A, mobile handset device 1000 may include a housing with a front 1001 and back 1002. Device 1000 includes a display 1004, an input/output (I/O) device 1006, and an integrated antenna 1008. Device 1000 also may include navigation features 1012. Display 1004 may include any suitable display unit for displaying information appropriate for a mobile computing device. I/O device 1006 may include any suitable I/O device for entering information into a mobile computing device. Examples for I/O device 1006 may include an alphanumeric keyboard, a numeric keypad, a touch pad, input keys, buttons, switches, microphones, speakers, voice recognition device and software, and so forth. Information also may be entered into device 1000 by way of microphone (not shown), or may be digitized by a voice recognition device. Embodiments are not limited in this context. Integrated into at least the back 1002 is camera 1005 (e.g., including one or more lenses, apertures, and image sensors). Also visible in back 1002 is light pattern projector 125, for example as described elsewhere herein.

Figure 10B:
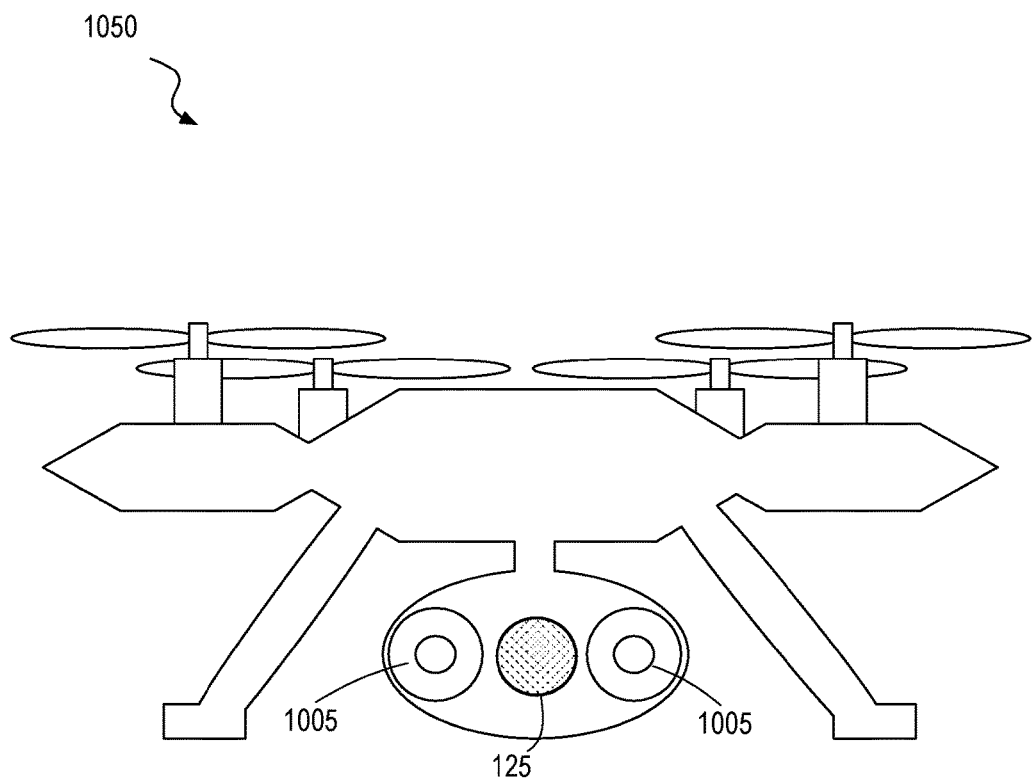
FIG. 10B is a diagram of an exemplary quadcopter platform including a camera and a LED pattern projector, in accordance with some embodiments.

FIG. 10B is a diagram of an exemplary quadcopter platform 1050 including one or more camera 1005 and light pattern projector 125, in accordance with some embodiments. Each camera 1005 may include one or more lenses, apertures, and image sensors. Light pattern projector 125 may have any of the attributes described elsewhere herein, and may be synchronized with camera 1005 in one or more of the manners described elsewhere herein. Quadcopter platform 1050 includes two pairs of fixed pitched propellers; a first pair providing lift when rotating clockwise (CW) and a second pair providing lift when rotating counterclockwise (CCW). Quadcopter platform 1050 includes one or more computer processors, electronic accelerometers, and a global positioning system (GPS). Quadcopter platform 1050 may be configured for autonomous aerial photography and/or surveillance. Computer processors may execute software, such as the PX4 autopilot system, that allows a user to define way-points to which the quadcopter platform 1050 will autonomously fly and perform a task. One such task may be aerial photography with camera 1005 operating with a rolling shutter synchronized with rolling illumination from light projection array 100, for example as described elsewhere herein.

Embodiments described herein may be implemented using hardware elements, software elements, or a combination of both. Examples of hardware elements or modules include: processors, microprocessors, circuitry, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software elements or modules include: applications, computer programs, application programs, system programs, machine programs, operating system software, middleware, firmware, routines, subroutines, functions, methods, procedures, software interfaces, application programming interfaces (API), instruction sets, computing code, computer code, code segments, computer code segments, data words, values, symbols, or any combination thereof. Determining whether an embodiment is implemented using hardware elements and/or software elements may vary in accordance with any number of factors considered for the choice of design, such as, but not limited to: desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable storage medium. Such instructions may reside, completely or at least partially, within a main memory and/or within a processor during execution thereof by the machine, the main memory and the processor portions storing the instructions then also constituting a machine-readable storage media. Programmable logic circuitry may have registers, state machines, etc. configured by the processor implementing the computer readable media. Such logic circuitry, as programmed, may then be understood to have been physically transformed into a system falling within the scope of the embodiments described herein. Instructions representing various logic within the processor, which when read by a machine may also cause the machine to fabricate logic adhering to the architectures described herein and/or to perform the techniques described herein. Such representations, known as cell designs, or IP cores, may be stored on a tangible, machine-readable medium and supplied to various customers or manufacturing facilities to load into the fabrication machines that actually make the logic or processor.

As used in any implementation described herein, the term "module" refers to any combination of software, firmware and/or hardware configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

Further examples of specific embodiments are now provided below.

In first examples, a camera platform comprises an image sensor array to collect light from portions of a scene within a field of view of the image sensor array. The platform comprises a light projector to cast a light pattern upon portions of the scene. The light projector further comprises a light emitting diode (LED) source, a mask to spatially modulate an intensity of emissions from the LED, and a projector lens to reimage the spatially modulated emission onto the portions of the scene.

In second examples, for any of the first examples, the LED source comprises a first emitter having a half-emission cone angle of at least 45°, and an emission spectrum of at least 4 nm. A first sensor pixel line is to integrate photocharge for a first portion of the scene over a first time increment. A second sensor pixel line is to integrate photocharge for a second portion of the scene over a second time increment, and the light projector is to illuminate the first portion and second portions of the scene with illumination from the first light emitter during the first and second time increments.

In third examples, for any of the first through second examples, the mask is an amplitude mask comprising a mask pattern of high and low amplitude transmittance regions.

In fourth examples, for any of the first through third examples, the mask is between the LED source and the projector lens, and wherein the projector lens comprises a microlens array (MLA).

In fifth examples, for any of the fourth examples the MLA comprises a plurality of lenslets, each having a convex surface distal from the LED source, and the mask is in contact with a surface of the projector lens proximal to the LED source.

In sixth examples, for any of the fourth through fifth examples the mask pattern comprises at least 400 features and wherein the MLA comprises at least 9 lenslets.

In seventh examples, for any of the fourth through sixth examples, the mask is in contact with a substantially planar lens surface, wherein the MLA comprise a first material, and wherein the low transmittance regions comprise a second material of a different composition than the first material.

In eighth examples, for any of the fourth through seventh examples, the projector lens has a fly's eye architecture in which the MLA has convex surface curvature over a diameter of the projector lens.

In ninth examples, for any of the first examples the mask is a refractive mask comprising a microlens array (MLA), the MLA comprising a plurality of lenslets, each having a convex surface proximal to the LED source.

In tenth examples, for any of the ninth examples the mask and the projector lens comprise a monolithic optical element of substantially homogeneous composition.

In eleventh examples, a pattern projector to cast a light pattern upon portions of the scene comprises an amplitude mask comprising a mask pattern of high and low transmittance regions to spatially modulate an intensity of an illumination source, and a projector lens, wherein the projector lens comprises a microlens array (MLA) including a first lenslet to reimage the spatially modulated emission onto a first portion of a scene, and a second lenslet to reimage the spatially modulated emission onto a first portion of a scene.

In twelfth examples, for any of the eleventh examples, the mask is in contact with a first projector surface, and wherein the first and second lenslets each have a convex surface distal from the mask.

In thirteenth examples, for any of the eleventh through twelfth examples the mask pattern comprises at least 400 features and wherein the MLA comprises at least 9 lenslets.

In fourteenth examples, for any of the twelfth examples the projector lens has a fly's eye architecture in which the MLA has convex surface curvature over a diameter of the projector lens.

In fifteenth examples, for any of the twelfth through fourteenth examples the projector comprises a second MLA, the second MLA comprising a plurality of lenslets, each having a convex surface opposite the convex surface of the first MLA.

In sixteenth examples, for any of the fifteenth examples the first and second MLA comprise a monolithic optical element of substantially homogeneous composition.

In seventeenth examples, a method of fabricating a pattern projector comprises molding a projector lens, the projector lens including a microlens array (MLA) having a first lenslet and a second lenslet, each having a convex surface, and applying a mask to a surface of the projector lens opposite the convex surfaces of the lenslets, wherein the mask comprises a pattern of high and low amplitude transmittance regions.

In eighteenth examples, for any of the seventeenth examples applying the mask further comprises at least one of: printing the low transmittance regions with an ink, laminating a dry film onto the projector lens and patterning the dry film into the low transmittance regions, or modifying portions of the projector lens material into the low transmittance regions through laser processing.

In nineteenth examples, for any of the seventeenth examples molding the projector lens further comprises molding an optically transmissive material into a fly's eye projector lens in which the MLA has convex surface curvature over a diameter of the projector lens.

In twentieth examples, for any of the seventeenth through eighteenth examples, the method further comprises assembling the projector lens with an LED light source.

It will be recognized that the embodiments is not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A camera platform comprising:
   an image sensor array to collect light from portions of a scene within a field of view of the image sensor array; and a light projector to cast a light pattern upon portions of the scene, wherein the light projector further comprises:
a light emitting diode (LED) source;
a mask to spatially modulate an intensity of emission from the LED source; and
a projector lens to reimage the spatially modulated emission onto the portions of the scene, wherein the projector lens comprises a microlens array (MLA) including a first lenslet to reimage the spatially modulated emission onto a first portion of the scene, and a second lenslet to reimage the spatially modulated emission onto a second portion of the scene.

2. The camera platform of claim 1, wherein:
the LED source comprises a first emitter having a half-emission cone angle of at least 45°, and an emission spectrum of at least 4 nm;
a first sensor pixel line is to integrate photocharge for a first portion of the scene over a first time increment;
a second sensor pixel line is to integrate photocharge for a second portion of the scene over a second time increment; and
the light projector is to illuminate the first portion and second portion of the scene with illumination from the first emitter during the first and second time increments.

3. The camera platform of claim 1, wherein the mask is an amplitude mask comprising
a mask pattern of high and low amplitude transmittance regions.

4. The camera platform of claim 3, wherein the mask is between the LED source and the projector lens.

5. The camera platform of claim 1, wherein the lenslets each have a convex surface distal from the LED source and wherein the mask is in contact with a surface of the projector lens proximal to the LED source.

6. The camera platform of claim 5, wherein the mask comprises at least 400 features and wherein the MLA comprises at least 9 lenslets.

7. The camera platform of claim 5, wherein the mask is in contact with a substantially planar lens surface, wherein the MLA comprise a first material, and wherein the low transmittance regions comprise a second material of a different composition than the first material.

8. The camera platform of claim 1, wherein the projector lens has a fly's eye architecture in which the MLA has convex surface curvature over a diameter of the projector lens.

9. The camera platform of claim 1, wherein the mask and the projector lens comprise a monolithic optical element of substantially homogeneous composition.

10. A pattern projector to cast a light pattern upon portions of a scene, wherein the pattern projector further comprises:

an amplitude mask comprising a mask pattern of high and low transmittance regions to spatially modulate an intensity of an illumination source; and
a projector lens, wherein the projector lens comprises a microlens array (MLA) including a first lenslet to reimage the spatially modulated emission onto a first portion of a scene, and a second lenslet to reimage the spatially modulated emission onto a second portion of the scene.

11. The pattern projector of claim 10, wherein the mask is in contact with a first projector surface, and wherein the first and second lenslets each have a convex surface distal from the mask.

12. The pattern projector of claim 11, wherein the mask pattern comprises at least 400 features and wherein the MLA comprises at least 9 lenslets.

13. The pattern projector of claim 11, wherein the projector lens has a fly's eye architecture in which the MLA has convex surface curvature over a diameter of the projector lens.

14. The pattern projector of claim 10, further comprising a second MLA, the second MLA comprising a plurality of lenslets, each having a convex surface opposite the convex surface of the first MLA.

15. The pattern projector of claim 14, wherein the first and second MLA comprise a monolithic optical element of substantially homogeneous composition.

16. A method of fabricating a pattern projector, the method comprising:
molding a projector lens, the projector lens including a microlens array (MLA) having a first lenslet and a second lenslet, each having a convex surface; and
applying a mask to a surface of the projector lens opposite the convex surfaces of the lenslets, wherein the mask comprises a pattern of high and low amplitude transmittance regions.

17. The method of claim 16, wherein applying the mask further comprises at least one of: printing the low transmittance regions with an ink, laminating a dry film onto the projector lens and patterning the dry film into the low transmittance regions, or modifying portions of the projector lens material into the low transmittance regions through laser processing.

18. The method of claim 16, wherein molding the projector lens further comprises molding an optically transmissive material into a fly's eye projector lens in which the MLA has convex surface curvature over a diameter of the projector lens.

19. The method of claim 16, further comprising assembling the projector lens with an LED light source.

* * * * *